United States Patent
Sheriff et al.

(10) Patent No.: US 10,471,947 B1
(45) Date of Patent: Nov. 12, 2019

(54) DETERMINING ESTIMATED REMAINING USE OF BRAKE ASSEMBLY BY TRANSCEIVER

(71) Applicant: Honeywell International Inc., Morris Plains, NJ (US)

(72) Inventors: Shajahan Sheriff, Madurai (IN); Vedavyas Rallabandi, Bangalore (IN); Pradeep Huncha, Bangalore (IN); Raghavendra Muniraju, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/964,279

(22) Filed: Apr. 27, 2018

(51) Int. Cl.
  *B60Q 1/00* (2006.01)
  *B60T 17/22* (2006.01)
  *G01B 11/06* (2006.01)

(52) U.S. Cl.
  CPC ........ *B60T 17/221* (2013.01); *G01B 11/0691* (2013.01)

(58) Field of Classification Search
  CPC .......................... B60T 17/221; G01B 11/0691
  USPC ......................................................... 340/454
  See application file for complete search history.

(56) References Cited

U.S. PATENT DOCUMENTS

| | | |
|---|---|---|
| 576,671 A | 2/1897 | Hamlin |
| 2,522,181 A | 9/1950 | Krikorian |
| 3,604,865 A * | 9/1971 | Bricker ................... F16D 66/00 200/61.4 |
| 4,013,143 A | 3/1977 | Juhasz |
| 4,107,604 A | 8/1978 | Bernier |
| 4,184,145 A | 1/1980 | Fima |
| 4,279,214 A | 7/1981 | Thorn |
| 4,318,955 A | 3/1982 | Kulakov et al. |
| 4,495,464 A | 1/1985 | Kozai et al. |
| 4,520,661 A | 6/1985 | Tamai et al. |
| 4,550,815 A | 11/1985 | Gale |
| 4,583,071 A | 4/1986 | Sebalos et al. |
| 4,642,603 A | 2/1987 | Martinez, Jr. |

(Continued)

FOREIGN PATENT DOCUMENTS

| | | |
|---|---|---|
| CN | 102874247 A | 1/2013 |
| DE | 3220773 A1 | 12/1983 |

(Continued)

OTHER PUBLICATIONS

U.S. Appl. No. 16/129,316, by Honeywell International Inc. (Inventors: Muniraju, Raghavendra et al.), filed Sep. 12, 2018.

(Continued)

*Primary Examiner* — Kerri L McNally
*Assistant Examiner* — Thang D Tran
(74) *Attorney, Agent, or Firm* — Shumaker & Sieffert, P.A.

(57) ABSTRACT

In some examples, device is configured to determine an estimated remaining use of a brake assembly. The device includes a transceiver configured to transmit a signal towards a wear pin in the brake assembly at a first time. The transceiver is also configured to receive a reflection of the signal from the wear pin at a second time. The device further includes processing circuitry configured to determine a difference of the first time and the second time. The processing circuitry is also configured to determine the estimated remaining use of the brake assembly based on the difference of the first time and the second time.

20 Claims, 6 Drawing Sheets

(56) References Cited

U.S. PATENT DOCUMENTS

| | | | |
|---|---|---|---|
| 4,658,936 A * | 4/1987 | Moseley | F16D 55/40 |
| | | | 116/208 |
| 4,664,239 A | 5/1987 | Symes et al. | |
| 4,757,300 A | 7/1988 | Sebalos | |
| 4,776,438 A | 10/1988 | Schandelmeier | |
| 4,852,404 A | 8/1989 | Catanese | |
| 4,855,712 A | 8/1989 | Wiley, Jr. et al. | |
| 4,989,537 A | 2/1991 | Hutchinson, Sr. et al. | |
| 5,035,303 A | 7/1991 | Sullivan | |
| 5,044,302 A | 9/1991 | Goldfein et al. | |
| 5,087,907 A | 2/1992 | Weiler et al. | |
| 5,125,280 A | 6/1992 | Koscinski et al. | |
| 5,133,431 A * | 7/1992 | Braun | F16D 66/024 |
| | | | 188/1.11 L |
| 5,148,107 A | 9/1992 | Finger et al. | |
| 5,186,284 A | 2/1993 | Lamela et al. | |
| 5,228,541 A | 7/1993 | Plude | |
| 5,251,729 A | 10/1993 | Nehl et al. | |
| 5,255,760 A | 10/1993 | Lamb et al. | |
| 5,255,761 A | 10/1993 | Zaremsky | |
| 5,310,023 A | 5/1994 | Martinez | |
| 5,327,782 A | 7/1994 | Sato et al. | |
| 5,338,320 A | 8/1994 | Fukuda et al. | |
| 5,388,320 A | 2/1995 | Smith et al. | |
| 5,410,293 A | 4/1995 | Angerfors | |
| 5,433,296 A | 7/1995 | Webberley | |
| 5,450,930 A | 9/1995 | Martens et al. | |
| 5,474,154 A | 12/1995 | Coale | |
| 5,494,138 A | 2/1996 | Scelsi et al. | |
| 5,717,174 A | 2/1998 | Ramos | |
| 5,767,768 A | 6/1998 | DiSaverio | |
| 5,825,287 A | 10/1998 | Zarybnicky, Sr. et al. | |
| 5,848,672 A * | 12/1998 | Brearley | F16D 65/18 |
| | | | 188/1.11 L |
| 5,882,781 A | 3/1999 | Lawton et al. | |
| 5,906,253 A | 5/1999 | Rancourt et al. | |
| 5,934,415 A | 8/1999 | Preston et al. | |
| 5,952,075 A | 9/1999 | Clarke et al. | |
| 5,967,266 A | 10/1999 | Carnegie | |
| 5,973,996 A * | 10/1999 | Zhevelev | G01S 15/523 |
| | | | 367/99 |
| 6,003,640 A | 12/1999 | Ralea | |
| 6,077,464 A | 6/2000 | Murdie et al. | |
| 6,112,859 A | 9/2000 | Shuck et al. | |
| 6,183,583 B1 | 2/2001 | Duval et al. | |
| 6,202,811 B1 | 3/2001 | Wallrafen | |
| 6,237,723 B1 | 5/2001 | Salsman | |
| 6,257,374 B1 | 7/2001 | Strzelczyk et al. | |
| 6,328,144 B1 | 12/2001 | Hayakawa et al. | |
| 6,342,171 B1 | 1/2002 | Murdie et al. | |
| 6,352,137 B1 | 3/2002 | Stegall et al. | |
| 6,356,072 B1 | 3/2002 | Chass | |
| 6,365,257 B1 | 4/2002 | Hecht | |
| 6,366,201 B1 * | 4/2002 | Hanisko | F16D 66/026 |
| | | | 188/1.11 E |
| 6,411,206 B1 | 6/2002 | Weant et al. | |
| 6,460,659 B1 | 10/2002 | Schaffer et al. | |
| 6,537,470 B1 | 3/2003 | Wood et al. | |
| 6,634,465 B1 | 10/2003 | Tuschen | |
| 6,659,233 B2 | 12/2003 | DeVlieg | |
| 6,691,393 B2 | 2/2004 | James et al. | |
| 6,696,937 B1 | 2/2004 | Kiefer | |
| 6,702,069 B2 | 3/2004 | Ralea et al. | |
| 6,719,102 B2 | 4/2004 | Takanashi | |
| 6,753,771 B2 | 6/2004 | Lesesky | |
| 6,776,266 B2 | 8/2004 | Fuglewicz et al. | |
| 6,929,333 B2 | 8/2005 | DeVlieg | |
| 6,939,490 B2 | 9/2005 | La Forest et al. | |
| 7,014,016 B2 | 3/2006 | Morris et al. | |
| 7,025,913 B2 | 4/2006 | La Forest et al. | |
| 7,086,503 B2 | 8/2006 | Miller et al. | |
| 7,108,107 B2 | 9/2006 | Ralea et al. | |
| 7,114,596 B2 | 10/2006 | Borugian | |
| 7,172,408 B2 | 2/2007 | Wood et al. | |
| 7,252,499 B2 | 8/2007 | La Forest et al. | |
| 7,322,447 B2 | 1/2008 | Deckhut et al. | |
| 7,374,709 B2 | 5/2008 | Bauer | |
| 7,525,062 B2 | 4/2009 | Adam et al. | |
| 7,535,131 B1 | 5/2009 | Safieh, Jr. | |
| 7,610,998 B2 | 11/2009 | Baumgartner et al. | |
| 7,673,721 B2 | 3/2010 | Bailey et al. | |
| 7,766,130 B2 | 8/2010 | Walker et al. | |
| 7,877,216 B2 | 1/2011 | Wright et al. | |
| 8,207,729 B2 * | 6/2012 | Erickson | G01D 5/2013 |
| | | | 324/207.25 |
| 8,405,386 B2 | 3/2013 | Erickson et al. | |
| 8,717,159 B2 | 5/2014 | Todd et al. | |
| 9,017,761 B2 | 4/2015 | La Forest et al. | |
| 9,146,308 B2 * | 9/2015 | Mahajan | G01C 3/08 |
| 9,353,816 B2 | 5/2016 | La Forest et al. | |
| 9,441,692 B2 | 9/2016 | Schaefer | |
| 9,482,301 B2 | 11/2016 | Lamkin et al. | |
| 2001/0019752 A1 | 9/2001 | Purdy et al. | |
| 2002/0089327 A1 | 7/2002 | Spellman | |
| 2002/0170787 A1 | 11/2002 | James et al. | |
| 2003/0100239 A1 | 5/2003 | Gaffney et al. | |
| 2003/0214064 A1 | 11/2003 | Shin et al. | |
| 2004/0105969 A1 | 6/2004 | Huang et al. | |
| 2004/0251090 A1 | 12/2004 | Morris et al. | |
| 2005/0054301 A1 * | 3/2005 | Brown | H04B 3/46 |
| | | | 455/67.14 |
| 2005/0168721 A1 * | 8/2005 | Huang | G01S 7/487 |
| | | | 356/5.08 |
| 2005/0269873 A1 | 12/2005 | DeVlieg | |
| 2006/0042734 A1 * | 3/2006 | Turner | B60C 11/24 |
| | | | 152/154.2 |
| 2006/0046059 A1 | 3/2006 | Arico et al. | |
| 2006/0108182 A1 * | 5/2006 | Walker | F16D 66/02 |
| | | | 188/1.11 W |
| 2006/0151912 A1 | 7/2006 | Bauer | |
| 2006/0177663 A1 | 8/2006 | Simpson et al. | |
| 2006/0191751 A1 | 8/2006 | Miller et al. | |
| 2006/0219487 A1 | 10/2006 | Wille et al. | |
| 2006/0232392 A1 | 10/2006 | Emmett et al. | |
| 2006/0279012 A1 | 12/2006 | Simpson et al. | |
| 2007/0125607 A1 | 6/2007 | Ralea et al. | |
| 2007/0186396 A1 | 8/2007 | Linck et al. | |
| 2007/0251308 A1 * | 11/2007 | Canterbury | G01B 5/0028 |
| | | | 73/121 |
| 2007/0270069 A1 | 11/2007 | Lee et al. | |
| 2008/0041674 A1 | 2/2008 | Walker et al. | |
| 2008/0073161 A1 | 3/2008 | Pettersson et al. | |
| 2008/0090064 A1 | 4/2008 | James et al. | |
| 2008/0190712 A1 | 8/2008 | Hagberg | |
| 2008/0202865 A1 | 8/2008 | Pradier et al. | |
| 2009/0050418 A1 | 2/2009 | Vargas et al. | |
| 2009/0084637 A1 * | 4/2009 | Bailey | F16D 66/021 |
| | | | 188/1.11 E |
| 2009/0120735 A1 | 5/2009 | DeVlieg | |
| 2009/0177362 A1 | 7/2009 | Schmitt et al. | |
| 2009/0194895 A1 | 8/2009 | La Forest et al. | |
| 2009/0205910 A1 | 8/2009 | Cahill | |
| 2009/0229926 A1 * | 9/2009 | Schaefer | F16D 66/025 |
| | | | 188/1.11 L |
| 2010/0207608 A1 | 8/2010 | Erickson et al. | |
| 2010/0250028 A1 | 9/2010 | DeVlieg | |
| 2010/0286881 A1 * | 11/2010 | Cahill | B60T 8/00 |
| | | | 701/70 |
| 2011/0013173 A1 * | 1/2011 | Luo | G01S 7/4873 |
| | | | 356/5.01 |
| 2011/0033622 A1 | 2/2011 | La Forest et al. | |
| 2011/0111123 A1 | 5/2011 | La Forest et al. | |
| 2012/0132488 A1 * | 5/2012 | Seglo | B60T 17/22 |
| | | | 188/1.11 R |
| 2012/0226457 A1 | 9/2012 | Erickson et al. | |
| 2013/0261890 A1 * | 10/2013 | Roberts | F16D 65/568 |
| | | | 701/36 |
| 2016/0041058 A1 * | 2/2016 | Georgin | G01L 25/00 |
| | | | 702/98 |
| 2016/0225130 A1 * | 8/2016 | Venkatesha | B60T 17/221 |

(56) References Cited

U.S. PATENT DOCUMENTS

2016/0281808 A1* 9/2016 Lamkin .................. F16D 55/38
2019/0018107 A1* 1/2019 Warke ..................... G01S 7/484

FOREIGN PATENT DOCUMENTS

| | | |
|---|---|---|
| DE | 102005013142 A1 | 9/2006 |
| EP | 1538364 A1 | 6/2005 |
| EP | 1724245 A1 | 11/2006 |
| EP | 1911990 A2 | 4/2008 |
| EP | 1911990 A3 | 4/2009 |
| EP | 2093453 A1 | 8/2009 |
| FR | 2874675 A1 | 3/2006 |
| GB | 2302574 A | 1/1997 |
| GB | 2386951 A | 10/2003 |
| GB | 2470098 A | 11/2010 |
| JP | 2013088196 A | 5/2013 |
| WO | 9827023 A1 | 6/1998 |
| WO | 9849382 A1 | 11/1998 |
| WO | 0061518 A1 | 10/2000 |
| WO | 2004106766 A | 12/2004 |
| WO | 2006101799 A2 | 6/2006 |
| WO | 2017149276 | 9/2017 |

OTHER PUBLICATIONS

"Multiple-Disk Brake Assembly of Boeing 737," Flight Mechanic, retrieved from http://www.flight-mechanic.com/wp-content/uploads/2017/11/13-88.jpg, Nov. 13, 2017, 1 pp.

* cited by examiner

DETERMINING ESTIMATED REMAINING USE OF BRAKE ASSEMBLY BY TRANSCEIVER

TECHNICAL FIELD

The disclosure relates to vehicle brake systems.

BACKGROUND

During periodic maintenance, the amount of wear on a vehicle's braking assembly is manually assessed by a maintenance technician. On an aircraft, for example, the remaining life of the braking assembly is determined by observing the length of a wear indicator pin, also known as a wear pin.

SUMMARY

In general, this disclosure describes systems and methods for automated measurements of the remaining use of a vehicle's braking assembly. The measurement of the remaining use may indicate the number of remaining braking events (e.g., aircraft landings) with optimal braking without replacing the braking lining. A transceiver connected to processing circuitry can determine an estimate of the remaining use. The transceiver sends signals and receives reflections of the signals. The processing circuitry determines an estimated remaining use of the braking assembly based on the time of transmission and the time of receipt by the transceiver. The difference between the time of transmission and the time of receipt may also indicates, or relates to, the distance between the transceiver and the wear pin and the length of the wear pin, which the processing circuitry can use to estimate a remaining use or a remaining life for the braking assembly.

In some examples, a device is configured to determine an estimated remaining use of a brake assembly. The device includes a transceiver configured to transmit a signal towards a wear pin in the brake assembly at a first time and receive a reflection of the signal from the wear pin at a second time. The device also includes processing circuitry configured to determine a difference of the first time and the second time and determine the estimated remaining use of the brake assembly based on the difference of the first time and the second time.

In some examples, a method includes causing a transceiver to transmit a signal towards a wear pin in a brake assembly at a first time and causing the transceiver to receive a reflection of the signal from the wear pin at a second time. The method also includes determining a difference of the first time and the second time and determining an estimated remaining use of a brake assembly based on the difference of the first time and the second time.

In some examples, a device includes a computer-readable medium having executable instructions stored thereon, wherein the instructions are configured to be executable by one or more processors for causing the one or more processors to cause a transceiver to transmit a signal towards a wear pin in a brake assembly at a first time. The instructions are also configured to cause the one or more processors to cause the transceiver to receive a reflection of the signal from the wear pin at a second time. The instructions are further configured to cause the one or more processors to determine a difference of the first time and the second time and determining an estimated remaining use of a brake assembly based on the difference of the first time and the second time.

DETAILED DESCRIPTION

Figure 1:
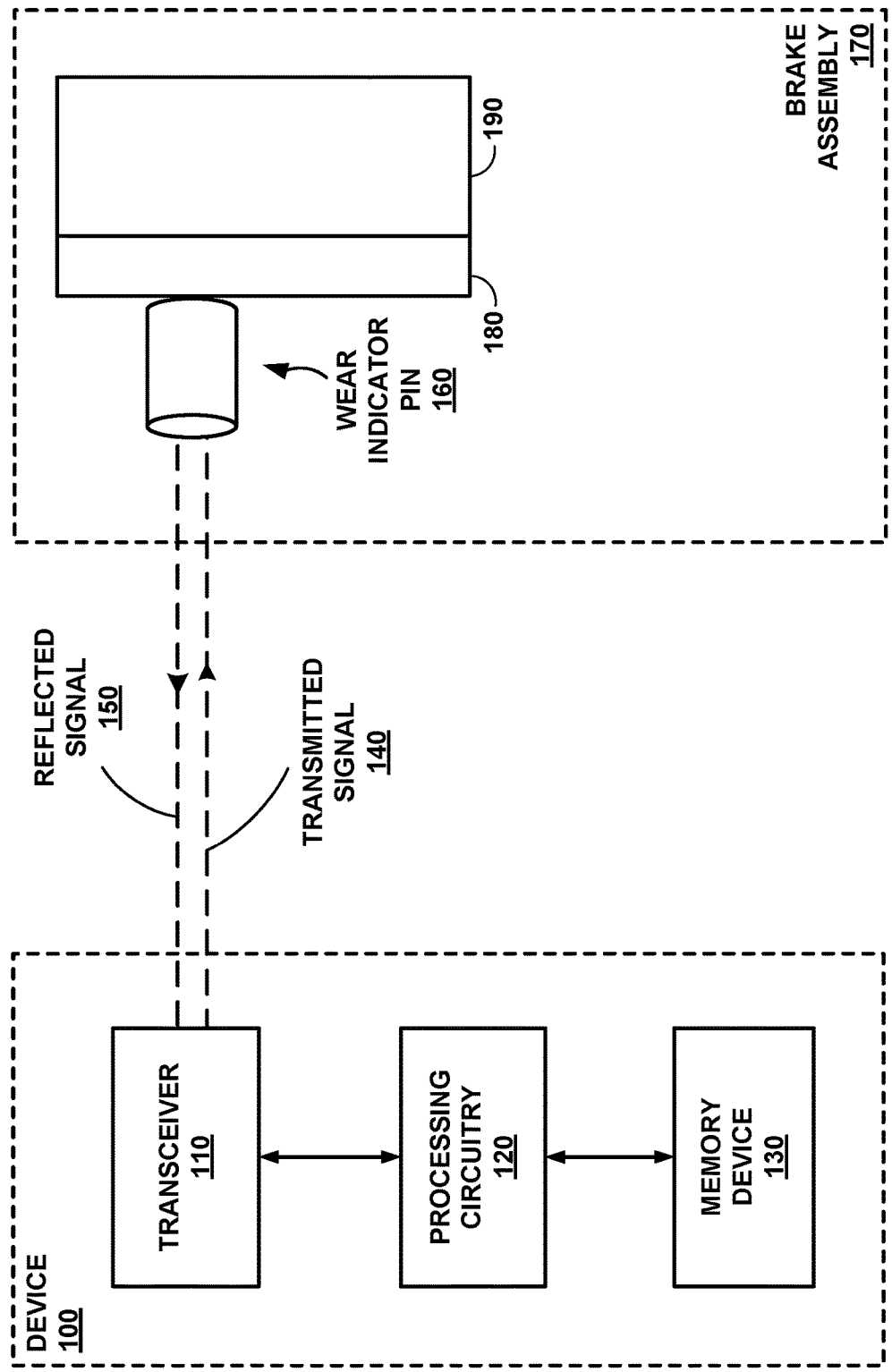
FIG. 1 is a conceptual block diagram depicting a device configured to determine an estimated remaining use of a brake assembly.

This disclosure describes techniques for determining an estimated remaining use of a brake assembly based on signals transmitted towards a wear pin (e.g., a "wear indicator" or a "wear indicator pin") in the brake assembly. In some examples, a device includes a transceiver configured to transmit a signal and receive a reflection of the signal. The device also includes processing circuitry configured to determine the time difference between the transmission and receipt of the signal. The processing circuitry is configured to determine an estimated remaining use of the brake assembly based on the time difference. In some examples, the processing circuitry is configured to determine the distance between the transceiver and the wear pin based on the time difference and determine the length of the wear pin based on the distance between the transceiver and the wear pin. The processing circuitry may be configured to determine the estimated remaining use based on an estimated rate of wear for a brake lining of the braking assembly.

The techniques described herein may be described with respect to determining a length of a wear pin with the understanding that the length of the wear pin corresponds to the amount of use or estimated life of the brake assembly. It should be understood however that when implemented by processing circuitry, the processing circuitry does not necessarily need a length and may just map a time to the estimated life of the brake assembly. The mapping, which may be stored to a memory device, can associate times and estimated remaining uses for the brake assembly. The mapping can be based on an equation, a lookup table, or a data structure and may include data such as times, distances, lengths, remaining uses, and wear rates.

The device can be installed in an existing brake assembly as a retrofit sensor (e.g., an after-market product), or the device can be built into a new brake assembly. In some examples, the device is installed such that the transceiver does not touch the wear pin. The processing circuitry may be configured to determine and track the length of the wear pin as the length declines over the life of the brake assembly. The processing circuitry may also be configured to output data indicating the length(s) of the wear pin and/or estimate(s) of the remaining life of the brake assembly.

Other methods of assessing the length of a brake assembly's wear indicator pin are not proactive, as they require a second person in the cockpit of the aircraft to apply the brakes or to set the parking brake before the pin can be observed. Thus, the techniques of this disclosure may enable a technician to more easily determine the length of the wear pin. Additionally, because the brakes are replaced when a technician observes that the wear pin is flush or nearly flush with the surface of the brake carrier, the brakes may not be used to the fullest extent of their remaining lifespan. A device of this disclosure may output indications of the distance between the transceiver and the wear pin, the length of the wear pin, the remaining use of the braking assembly, an alert, and/or other data determined by the processing circuitry. The device may generate more accurate notifications of the remaining life of a brake assembly, as compared to a caliper measurement, allowing maintenance workers to change the brakes at an appropriate time. Accurate notifications can allow maintenance workers to get all of the useful life out of the brakes, without the risk that replacement will be postponed too long. In some examples, one-tenth of one inch of length on the wear pin may last approximately one hundred braking events.

A monolithic construction of the proposed device can be placed on top of the brake system's carrier, surrounding the brake wear pin indicator. Opposite the brake wear pin, a laser transmitter and receiver can be installed. The laser transmitter and receiver may not physically contact the brake wear pin in order to conduct a measurement. A transceiver sends pulsed signals on the transmitter and receives the signals on the receiver. Processing circuitry may then measure the time taken for the light to travel from transmitter to receiver. Using the known speed of light, or any other applicable speed of the signals, the processing circuitry can determine the distance between the laser unit and the tip of the brake wear pin. The processing circuitry can interpret this information to show the brake wear pin length. Using a molding manufacturing process, the proposed device can be constructed so that the device can withstand the harsh environment conditions of an aircraft wheel. This method of measuring the length of the wear pin may not require human intervention because the processing circuitry may be configured to output an indication of the estimated remaining use and/or the length of the wear pin. The processing circuitry can measure and log data automatically and more frequently than other brake wear devices. This device may enable a vehicle operator, through a computing system located in an avionics bay, to apply algorithms on the measured data and predict the wear remaining on a brake assembly and plan for maintenance more efficiently.

FIG. 1 is a conceptual block diagram depicting a device 100 configured to determine an estimated remaining use of a brake assembly 170. Device 100 includes transceiver 110, processing circuitry 120, and memory device 130. Device 100 is physically attached to brake assembly 170 of a vehicle, such as an aircraft, a helicopter or a weather balloon, a space vehicle such as a satellite or spaceship, a land vehicle such as an automobile, a water vehicle such as a ship or a submarine, a manned vehicle, an unmanned vehicle such as a drone, a remote-control vehicle, or any suitable vehicle without any pilot or crew on board. Brake assembly 170 includes an external brake carrier, a wear indicator pin 160, plate 180, and brake lining 190.

Device 100 may be attached to brake assembly 170 by mounting, gluing, taping, soldering, and/or any other attaching technique. In some examples, transceiver 110 is attached to brake assembly 170 such that transceiver 110 does not move. Therefore, as the length of wear indicator pin 160 decreases, the difference in time between transmission of signal 140 and receipt of reflected signal 150 may increase, indicating an increased distance between transceiver 110 and wear indicator pin 160. The increased distance may indicate a reduction in the length of wear indicator pin 160, which indicates the remaining use of brake assembly 170.

Transceiver 110 includes both transmitting and receiving capabilities and can be directed toward an exposed tip of wear indicator pin 160. A transmitting component of transceiver 110 is capable of emitting a signal, such as transmitted signal 140, toward the tip of wear indicator pin 160. A receiving component of transceiver 110 is capable of sensing or detecting a signal, such as reflected signal 150, returning from wear indicator pin 160. Transceiver 110 may include a laser, an ultrasonic sensor, or any other sensor capable of sending and receiving signals.

Transmitted signal 140 may consist of an electromagnetic wave of a specific frequency, for example, light emitted from a laser or a radio-frequency (RF) wave. Transmitted signal 140 reflects off of the tip or surface of wear indicator pin 160, becoming reflected signal 150 having the same or similar frequency as transmitted signal 140. Transceiver 110 may transmit signal 140 at a first time and receive reflected signal 150 at a second time. For example, the first time and the second time may be one millisecond apart. The difference between the first time and the second time, along with the speed of signals 140 and 150 may indicate the distance between transceiver 110 and wear pin 160.

Processing circuitry 120 is configured to determine an estimated remaining use of brake assembly 170. Processing circuitry 120 may be configured to determine the estimated remaining use based directly on the time difference of signals 140 and 150, or processing circuitry 120 may first determine the length of wear indicator pin 160. Processing circuitry 120 can determine the length of wear indicator pin 160 based on the time difference and determine the remaining use of brake assembly 170 based on the length of wear indicator pin 160. Processing circuitry 120 may divide the length by an estimate of the wear (e.g., reduction in length) per braking event to determine the remaining use. Processing circuitry 120 can use the specifications for brake assembly 170 to determine the estimate of wear per braking event (e.g., rate of wear). Alternatively or additionally, processing circuitry 110 can use measurements of the length of wear indicator pin 160, along with the number of braking events between measurements, to determine the estimate of wear per braking event.

Processing circuitry 120 is configured to cause transceiver 110 to emit transmitted signal 140, and to subsequently receive from transceiver 110 a set of time data indicative of the time at which transceiver 110 received reflected signal 150. Processing circuitry 120 is further configured to determine a difference in time between the transmission of transmitted signal 140 and receipt of reflected signal 150, and to use this time difference along with a known signal velocity to determine the distance travelled by transmitted signal 140. Using this distance, processing circuitry 120 may be configured to determine the remaining length of wear indicator pin 160 by comparing the current distance measurement to an initial or previous distance or length. Processing circuitry 120 may also be configured to transmit the determined current length of wear indicator pin 160, along with a timestamp indicative of the time at which the length was measured, to be stored within memory device 130.

Processing circuitry 120 may further be configured to retrieve from memory device 130 a previous set of wear pin length and time data and use the data in conjunction with a current measurement in order to determine a rate of change of the length of wear pin 160 during the time between which the different measurements were conducted. Processing circuitry 120 may then transmit the rate of change data to be stored in memory device 130 along with the length and time data. Processing circuitry 120 may determine if the length of the wear pin is less than a threshold length and generate an alert in response to determining that the length of the wear pin is less than the threshold length. Such an alert may be an audio alert, such as a recorded verbal message or a tone, or alternatively or additionally, a visual alert, such as a displayed phrase, message, symbol, or color.

In some examples, processing circuitry 120 may perform data analysis on the data indicating the length of wear indicator pin 160. For example, processing circuitry 120 may use data indicating the number of braking events, the weather conditions during each braking event, the vehicle operator during each braking event, the type of surface for each braking event (asphalt, concrete, etc.), and/or any other data stored to memory device 130. Processing circuitry 120 may determine metrics such as the rate of wear and the estimated remaining life of wear indicator pin 160. Processing circuitry 120 may also determine when and whether to generate alerts regarding the status of wear indicator pin 160 and/or brake assembly 170. Alternatively or additionally, processing circuitry 120 may output the data to an external computing system, such as the avionics bay of an aircraft, to perform the data analysis on data relating to wear indicator pin 160 and/or brake assembly 170.

Memory device 130 is a non-transitory computer-readable medium capable of storing information indicative of the length of wear indicator pin 160 along with a timestamp indicating the time at which the measurement was made. Memory device 130 may be further configured to store multiple sets of length and time data, as well as rates of change of the length of wear pin 160 between subsequent measurements. Memory device 130 may also store threshold lengths and threshold distances that processing circuitry 120 may use to determine if wear pin 160 is approaching an end of useful life. In some examples, memory device 130 stores data relating to braking events, such as a measurement conducted when the brakes are applied, and weather or climate conditions.

Processing circuitry 120 may be configured to determine the estimated remaining use of brake assembly 170 directly based on the time difference of signals 140 and 150, for example, based on a mapping of time differences to remaining-use estimates stored to memory device 130. The mapping may take the form a data structure such as an array or a lookup table that associates estimated remaining uses with time differences. Processing circuitry 120 may use the mapping stored to memory device 130 to directly determine the estimated remaining use of brake assembly 170, or processing circuitry 120 may first determine the distance between transceiver 110 and wear indicator pin 160. Processing circuitry 120 may be configured to update the mapping stored to memory device 130 by storing the new value of the time difference and the new estimated remaining use of brake assembly 170 to memory device 130.

Device 100 may also include a communication module (e.g., communication module 240 shown in FIG. 2) configured to transmit data to an external computing system. The communication module may transmit data through a wired connection or a wireless connection to the external computing system. The transmitted data may indicate the estimated remaining use of brake assembly 170, the length of the wear, the rate of change of the length of the wear pin, and/or any other relevant data.

Wear indicator pin 160 is a component whose exposed length represents the remaining lifespan of brake assembly 170 of a vehicle. Wear indicator pin 160 is also referred to herein as "wear pin 160." In some examples, when the tip of wear indicator pin 160 is flush with the brake carrier, the vehicle's brakes may need replacement due to excessive wear. Wear indicator pin 160 may have any suitable shape, such as a cylinder or a rectangle, where the length of wear indicator pin 160 may decrease over time. As a cylinder, wear indicator pin 160 may have a radius of a few millimeters. Wear indicator pin 160 can also include a material layer, a coating, and/or a covering that indicates the wear of brake assembly 170.

Brake assembly 170 may include braking elements for slowing the speed of rotation of vehicle wheels, such as automobile wheels or aircraft landing gear. Brake assembly 170 may be mounted to or built in to the wheels. Device 100 may be mounted to a part of brake assembly 170, such as a brake carrier. Brake assembly 170 may also be referred to herein as a "braking assembly" or as a "braking system." As used herein, the term "the remaining use of brake assembly 170" may refer to the remaining use of brake lining 190.

Figure 3:
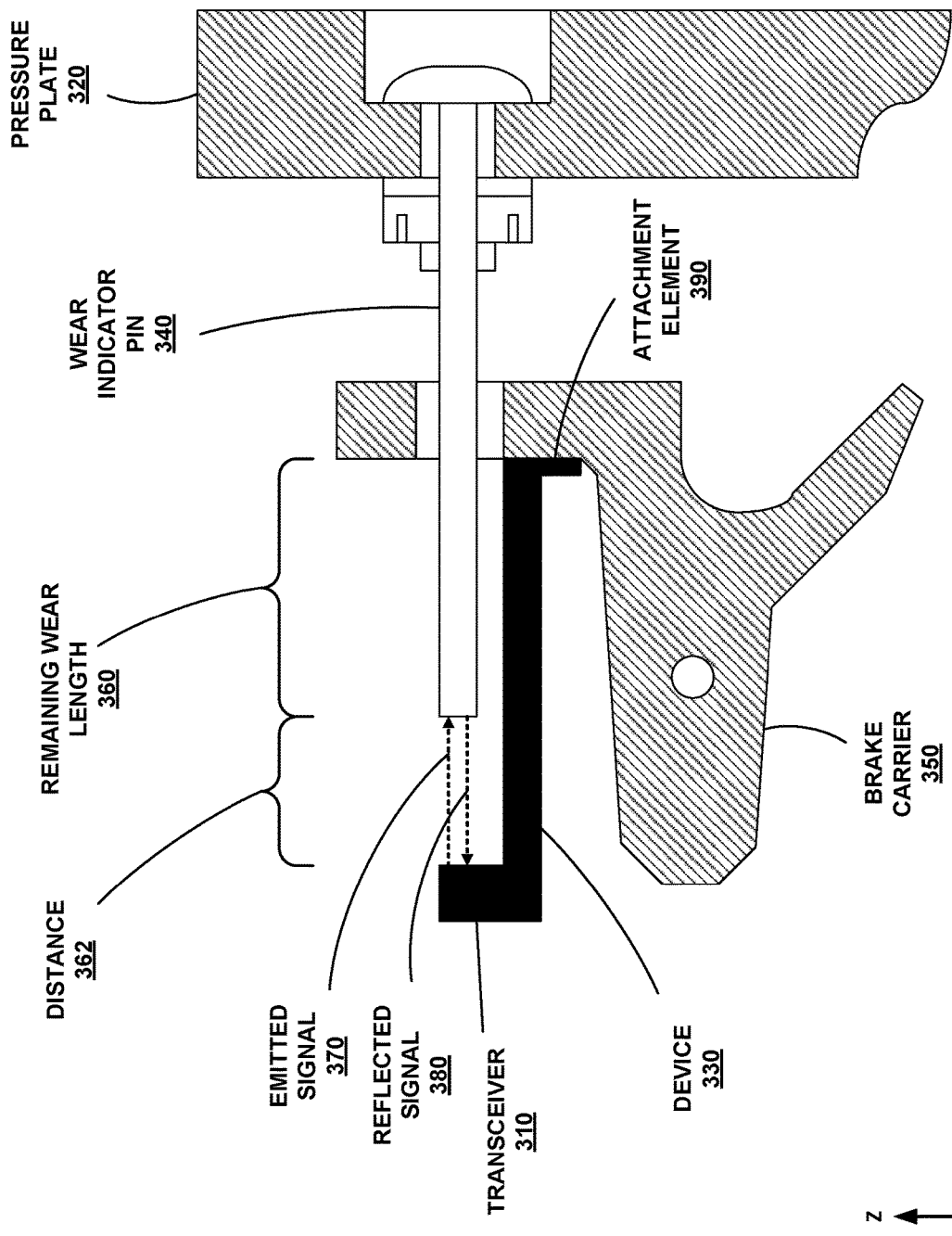
FIG. 3 is a diagram depicting an example of the device of FIG. 1 attached to a brake carrier.

Wear indicator pin 160 is mounted on plate 180 (e.g., by a rivet), which holds brake lining 190 on the other side of plate 190. Plate 180 may include metal material. Pressure plate 320 shown in FIG. 3 is an example of plate 180. Plate 180 can be attached to one or more pads of brake lining 190 that may include steel or carbon. When the brakes are applied during a braking event, a stationary hydraulic system can push or displace plate 180 against brake lining 190 thereby generating friction between the stationary pads of brake lining 190 and the rotating component, such as a wheel disc. The friction between the pads of brake lining 190 and the rotating component causes the rotation of the wheel to decline. Brake lining 190 may be the active portion of braking assembly that wears down over time due to braking events. Brake lining 190 may also be referred to as "a brake shoe" or "a brake pad."

In accordance with the techniques of this disclosure, processing circuitry 120 may determine the estimated remaining use of brake assembly 170 based on the time of transmission of signal 140 and the time of receipt of reflected signal 150. Device 100 may perform a measurement of the estimated remaining use of brake assembly 170 automatically (e.g., without a human operator). For example, a measurement of the estimated remaining use of brake assembly 170 may occur when the brakes of brake assembly 170 are applied. Processing circuitry 120 may be configured to determine when the brakes are applied and to cause, without human intervention, transceiver 110 to transmit and receive signals 140 and 150 when the brakes are applied.

The techniques of this disclosure may be especially useful for after-market devices that can be installed on existing brake assemblies. An after-market device may be installed on a brake carrier such that the device does not contact wear indicator pin 160.

Figure 2:
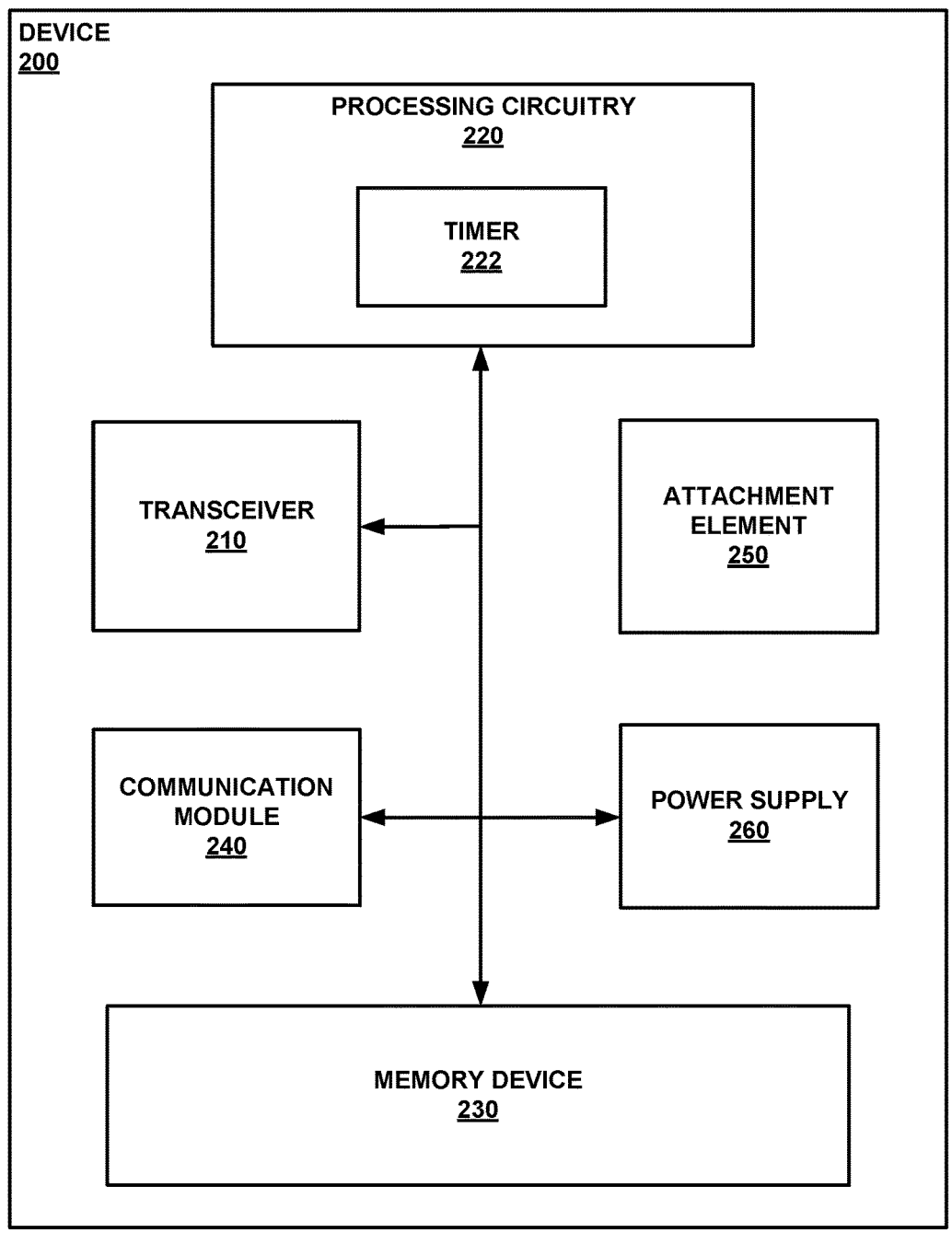
FIG. 2 is a conceptual block diagram of an example device of FIG. 1.

FIG. 2 is a conceptual block diagram of an example device of FIG. 1. Device 200 includes transceiver 210, processing circuitry 220, timer 222, memory device 230, communication module 240, attachment element 250, and power supply 260. Device 200 is an example of device 100 shown in FIG. 1. Device 200 is physically attached to a brake assembly of a vehicle, such as an aircraft, a helicopter or a weather balloon, a space vehicle such as a satellite or spaceship, a land vehicle such as an automobile, a water vehicle such as a ship or a submarine, a manned vehicle, an unmanned vehicle such as a drone, a remote-control vehicle, or any suitable vehicle without any pilot or crew on board.

Transceiver 210 includes both transmitting and receiving capabilities and can be directed toward an exposed tip or surface of the brake assembly's wear indicator pin. Transceiver 210 is an example of transceiver 110. A transmitting component of transceiver 210 is capable of emitting a signal toward the tip or surface of the wear indicator pin. A receiving component of transceiver 210 is capable of sensing or detecting a reflected signal returning from the wear indicator pin. Transceiver 210 may incorporate a laser, an ultrasonic sensor, or any other sensor capable of sending and receiving signals.

Processing circuitry 220 is configured to determine the length of a brake assembly's wear indicator pin. Processing circuitry 220 is configured to cause transceiver 210 to emit a signal, and to subsequently receive from transceiver 210 a reflection of that signal. Processing circuitry 220 can determine the remaining use based on the length of the wear pin and a rate of wear stored to memory device 230. Processing circuitry 220 may determine the remaining use in terms of the number of braking events.

Timer 222 is configured to transmit to processing circuitry 220 a first timestamp indicative of the time at which the signal was emitted. Timer 222 is further configured to transmit to processing circuitry a second timestamp indicative of the time at which the reflected signal was received or detected. In some examples, timer 222 may include a counter configured to increment a number stored to a register based on a clock signal. Processing circuitry 220 may be configured to reset timer 222 at the time that transceiver 210 transmits a signal towards a wear pin. Processing circuitry 220 may check the timer value when transceiver 210 receives a reflected signal to determine the time at which the reflected signal is received.

Processing circuitry 220 is further configured to determine a difference in time between the first timestamp, indicative of the transmitted signal, and the second timestamp, indicative of the reflected signal, and to use this time difference along with a known signal velocity to determine the distance travelled by the transmitted signal. Using this determined distance, processing circuitry 220 may be configured to determine the remaining length of the wear indicator pin by comparing the current distance measurement to an initial or previous distance or length measurement. Processing circuitry 220 may also be configured to transmit the determined current length of the wear indicator pin, along with a timestamp indicative of the time at which the current length measurement was made, to be stored within memory device 230.

Processing circuitry 220 may further be configured to retrieve from memory device 230 a previous set of estimated remaining use data and use the data in conjunction with a current measurement in order to determine a rate of change of the estimated remaining use during the time between which the different measurements were conducted. Processing circuitry 220 may then transmit the rate-of-change data to be stored in memory device 230 along with the current estimated remaining use and time data. Processing circuitry 220 may determine whether the estimated remaining use is less than a threshold amount and/or the length of the wear pin is less than a threshold length stored to memory device 230, and processing circuitry 220 may generate an alert in response to determining that the estimated remaining use is less than a threshold amount and/or the length of the wear pin is less than the threshold length. Processing circuitry 220 may cause communication module 240 to transmit the alert to an external device. Processing circuitry 220 may also be configured to determine that the estimated remaining use is less than a threshold amount and/or the length of the wear pin is greater than the threshold length and refrain from generating the alert in response to determining that the estimated remaining use is less than a threshold amount and/or the length of the wear pin is greater than the threshold length. In some examples, a determination that the estimated remaining use is less than a threshold amount and/or the length is less than the threshold length includes a determination that the estimated remaining use and/or the length is less than or equal than the threshold amount or the threshold length.

In some examples, processing circuitry 220 may perform data analysis on the data indicating the length of the wear indicator pin. For example, processing circuitry 220 may use data indicating the number of braking events, the weather conditions during each braking event, the vehicle operator during each braking event, the type of surface for each braking event (asphalt, concrete, etc.), and/or any other data stored to memory device 230. Processing circuitry 220 may determine metrics such as the rate of wear and the estimated remaining life of the wear indicator pin. Processing circuitry 220 may also determine whether and when to generate alerts regarding the status of the wear indicator pin and/or the vehicle's brake assembly.

Processing circuitry 220 may be further configured to cause device 200 to perform a measurement of the length of the wear indicator pin automatically (e.g., without a human operator). For example, a measurement of the length of the wear indicator pin may occur automatically when the brakes of the brake assembly are applied. Processing circuitry 220 may be configured to determine when the brakes are applied and to cause, without human intervention, transceiver 210 to transmit and receive signals when the brakes are applied.

Memory device 230 is a non-transitory computer-readable medium capable of storing information indicative of the length of wear indicator pin along with a timestamp indicating the time at which the measurement was made. Memory device 230 may be further configured to store multiple sets of length and time data, as well as rates of change of the length of wear pin between subsequent measurements. Memory device 230 may also store threshold amounts, threshold lengths, and threshold distances that processing circuitry 220 may use to determine if the wear indicator pin is approaching the end of its useful life. In some examples, memory device 230 stores data relating to braking events and weather conditions. Memory device 230 may also store reference data indicating an initial remaining use and/or an initial length of the wear pin or a distance between transceiver 210 and a brake carrier. In some examples, it may be acceptable for the surface of the wear pin to reach the edge of the brake carrier, or there may a particular distance from the edge of the brake carrier at which the wear pin indicates that the brakes should be replaced.

Communication module 240 may output any or all of the collected measurements, determined data, and/or generated alerts to an external receiver (e.g., an external device). An external receiver may consist of a computing system, such as the avionics bay of an aircraft, to perform data analysis on data relating to the wear indicator pin and/or the vehicle's brake assembly. Alternatively or additionally, communication module 240 may output the data or generated alerts to a display device, to be observed by, for example, a pilot, driver, or mechanic. Communication module 240 may consist of a hard-wired system, such as wires or fiber-optic cable and/or a wireless communication system, such as Wi-Fi, Bluetooth, radio-frequency identification (RFID), near-field communication (NFC), or any other electromagnetic signal.

Attachment element 250 connects device 200 to the external carrier of a vehicle's brake assembly, such that transceiver 210 is not capable of moving with respect to the external carrier. The connection between device 200 and the brake assembly may be a rigid connection or there may be some flexibility to the connection. Attachment element 250 may be connected to the brake assembly by any appropriately permanent means, for example, by mounting, screwing, welding, gluing, taping, soldering, and/or any other attaching technique. In some examples, attachment element 250 includes an electro-mechanical element, such as a solenoid configured to provide attachment means in response to an electrical current.

There are different types of brake systems available depending on the type of aircraft, ranging from single disc brakes to segmented rotor brakes and carbon brakes. For simple brake systems, wear determination can include visually inspecting the brake disc. For complex brake systems, the brake assembly may include a wear indicator pin to help device 200 to determine the brake wear. The brake wear pin protrudes out via brake carrier or a carrier element. Device 200 can be mounted on the brake carrier or the carrier element rigidly such that the device 200 does not move and transceiver 210 is positioned directly above the wear pin and configured to transmit and receive the return signal.

Power supply 260 delivers electrical power to drive device 200. Power supply 260 may consist of an external battery, such as a lithium-ion battery or any lithium-based chemistry battery. Alternatively, power supply 260 may consist of an existing power source that is delivering power to the rest of the wheel-and-brake assembly. Alternatively, power supply 260 may consist of a system for passively harvesting energy emitted by the rest of the brake assembly. An example of such a passive energy source may include thermo-electric generators (TEG) or vibration or electromagnetic power sources. Additionally, capacitors (e.g., supercapacitors) may be used as an energy storage device and auxiliary power source for the system. Device 200 may be configured to use low amounts of power, operating only in conjunction with a harvested energy source or with a battery. For example, the sampling period of any sensor output monitoring may be optimized to save energy by drawing power only during the sampling period, and the sensor may operate in a "sleep mode" at all other times.

FIG. 3 is a diagram depicting an example of the device of FIG. 1 attached to a vehicle brake assembly. The brake assembly may include some or all of the components shown in FIG. 3. The system includes transceiver 310, pressure plate 320, device 330, wear indicator pin 340, brake carrier 350, signal 370, reflected signal 380, and attachment element 390. FIG. 3 is an example configuration for a brake assembly and device 330, such that device 330 can determine the length of wear indicator pin 340. Although labeled separately, transceiver 310 may be a part of device 330.

The vehicle brake assembly includes pressure plate 320, wear indicator pin 340, and brake carrier 350. Pressure plate 320 is configured to move with respect to brake carrier 350 as the vehicle's brakes wear down through use over time. Pressure plate 320 is an example of plate 180 shown in FIG. 1. Pressure plate 320 may be attached to a brake lining (e.g., a brake shoe a brake pad) that presses against a rotating component of a wheel to reduce the speed of the rotating component.

Because wear indicator pin 340 is physically coupled to pressure plate 320, wear indicator pin 340 likewise moves with respect to brake carrier 350, and with respect to device 330, which is physically coupled to brake carrier 350 through attachment element 390. In the example of FIG. 3, wear indicator pin 340 is attached to pressure plate 320 and protrudes through brake carrier 350. Because wear indicator pin 340 moves with respect to brake carrier 350, the exposed portion of wear indicator pin 340, or remaining wear length 360, decreases with use of the brakes. As remaining wear length 360 approaches zero, and the tip or surface of wear pin 340 approaches the surface of brake carrier 350, the brakes may be nearing the time at which they need to be replaced. When the surface of wear pin 340 is flush with the surface of brake carrier 350, the lifespan of the vehicle's brakes may be presumed to be over, or may be considered dangerous to continue using, as this may result in brake failure.

Device 330 is configured to accurately measure and monitor remaining wear length 360 of wear indicator pin 340, by measuring distance 362 between the tip of wear pin 340 and transceiver 310, positioned opposite the tip of wear pin 340.

Transceiver 310 is configured to transmit emitted signal 370 at a first time toward the tip of wear pin 340. Emitted signal 370 then reflects off the tip of wear pin 340 and becomes reflected signal 380. Transceiver 310 is configured to receive or detect reflected signal 380 at a second time. In some examples, device 330 is then configured to determine distance 362 between transceiver 310 and the tip of wear pin 340, which is equivalent to the distance travelled by emitted signal 370, which is also equivalent to the distance travelled by reflected signal 380. This measurement may be determined by the relation $$d_1 = v * \left(\frac{t_2 - t_1}{2}\right) \tag{1}$$

where:
- $d_1$ is distance 362 between transceiver 310 and the tip of wear pin 340;
- v is the known velocity of signals 370 and 380, for example, the speed of light, c;
- $t_2$ is the time at which reflected signal 380 was received by transceiver 310; and
- $t_1$ is the time at which emitted signal 370 was transmitted by transceiver 310.

From here, remaining wear length 360 may be determined by the relation shown in Equation (2).

$$L = d_2 - d_1 \tag{2}$$

where:
- L is remaining wear length 360;
- $d_2$ is the known distance between transceiver 310 and brake carrier 350 (or equivalently, the length of device 330); and
- $d_1$ is the previously determined distance 362 between transceiver 310 and the tip of wear pin 340.

Over time, the tip of wear indicator pin 340 moves in the positive y-axis direction towards the edge of brake carrier 350. As wear indicator pin 340 moves, distance 362 increases, and remaining wear length 360 decreases. Device 330 may be configured to store a threshold length for wear indicator pin 340, where the threshold length may indicate remaining wear length 360 when the brakes should be replaced. As an alternative or additional technique, device 330 may determine the remaining use of the brake assembly directly from the time difference of signals 370 and 380.

$$\text{Number of remaining braking events} = L/(\text{Wear per braking event}) \quad (3)$$

$$\text{Wear per braking event} = L_{original}/(\text{Original number of braking events}) \quad (4)$$

Using Equation (3), the processing circuitry of device 330 may be configured to then determine an estimate of the number of remaining braking events (e.g., landings) that can occur with optimal braking before replacing the brake lining. The processing circuitry can determine the number of remaining braking events by dividing the remaining wear length 360 (L) by the wear per braking event (e.g., rate of wear). The processing circuitry can determine the wear per braking event by dividing the original length ($L_{original}$) of wear indicator pin 340 by the original number of braking events specified by the part supplier, using Equation (4).

For example, if the original length of wear indicator pin 340 is one inch (e.g., approximately twenty-five millimeters), and the part supplier states that the new brake lining can perform for one thousand braking events, the processing circuitry determines that the wear per braking event is 0.001 inches or 0.025 millimeters. If the processing circuitry of device 330 later determines that a new length of wear indicator pin 340 is ten millimeters less than the original, the processing circuitry may determine that the new length is fifteen millimeters. Using a rate of wear of 0.025 millimeters per braking event and Equation (3), the processing circuitry determines that the remaining use of the brake lining is six hundred braking events.

Figure 4:
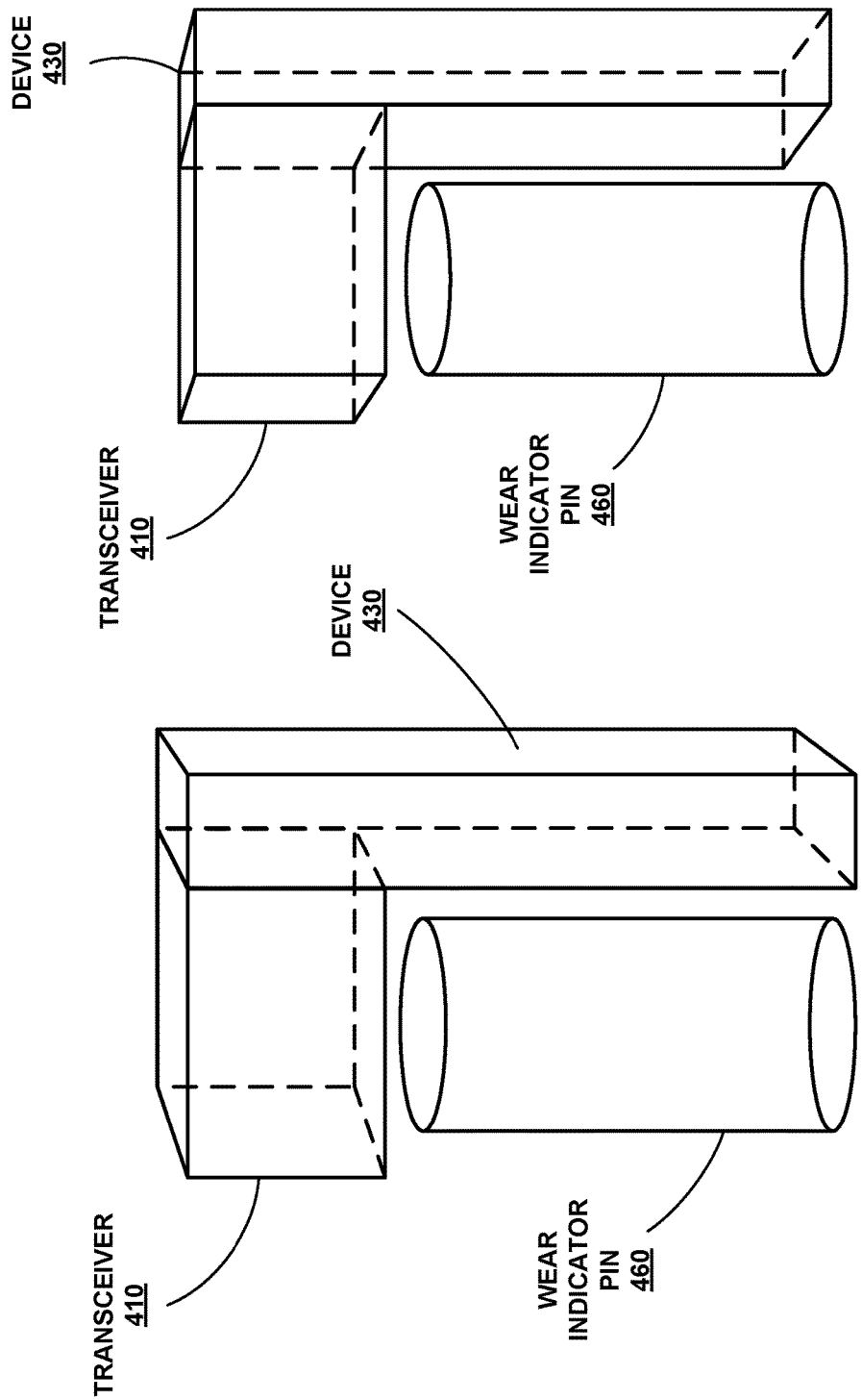
FIGS. 4A and 4B are perspective views of examples of a device and a wear pin.

FIGS. 4A and 4B are perspective views of examples of a device 430 and a wear pin. Device 430 is an example of device 100 shown in FIG. 1. Device 430 is positioned such that transceiver 410 is placed opposite the tip or end surface of wear indicator pin 460. Although labeled separately, transceiver 410 may be a part of device 430. FIGS. 4A and 4B depict wear indicator pin 460 as a cylinder, but wear indicator pin 460 may have a rectangular shape, a conical shape, and/or any other suitable shape.

Figure 5:
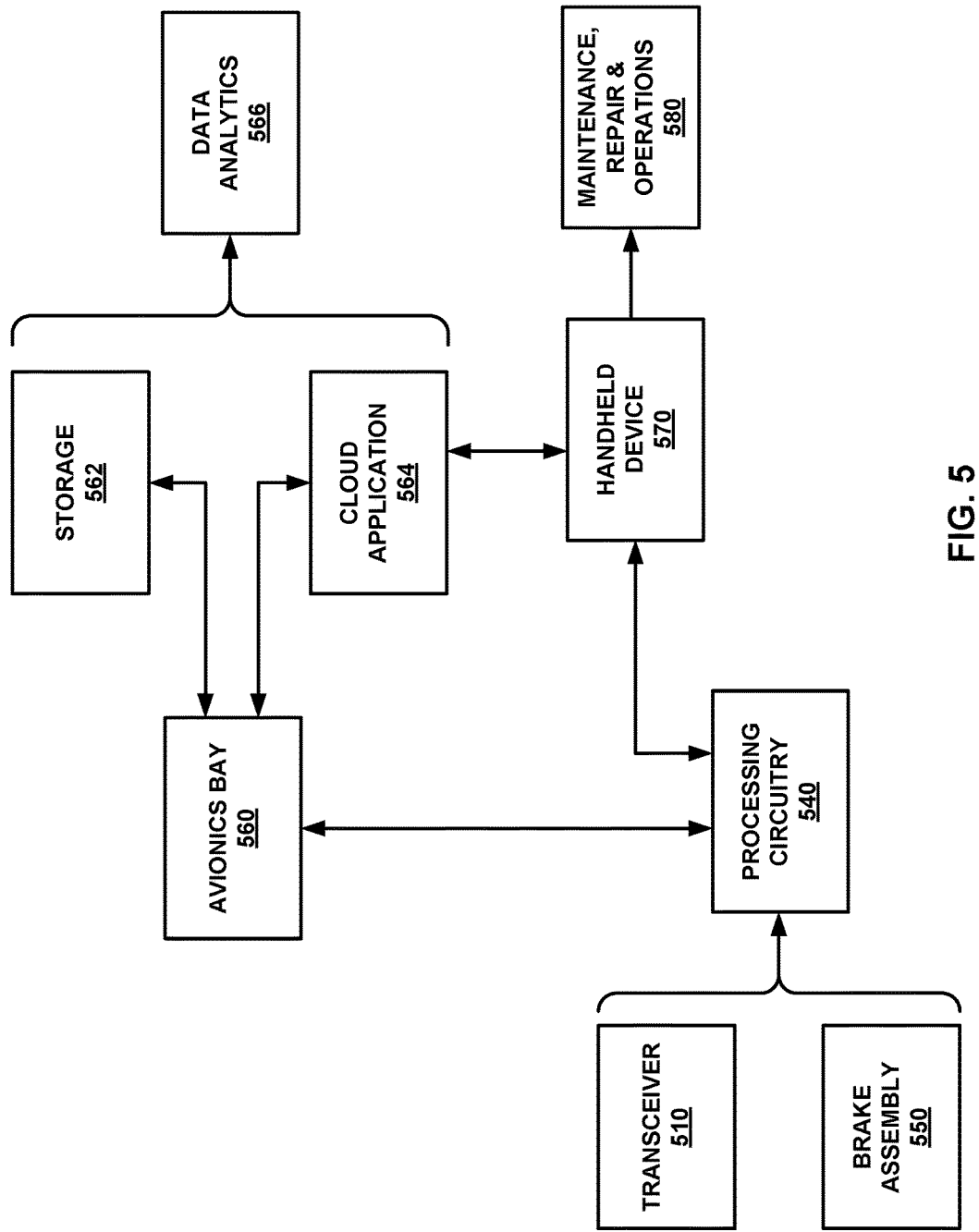
FIG. 5 is a conceptual block diagram illustrating a system with data analytics and cloud applications.

FIG. 5 is a conceptual block diagram illustrating a system with data analytics 566 and cloud applications 564. The computing system(s) of avionics bay 560 and handheld device 570 are examples of external devices to which processing circuitry 540 can communicate data and alerts. Avionics bay 560 can host embedded systems that are connected to the rest of the vehicle that contains brake assembly 550. Transceiver 510 reflects a signal off of a wear pin indicator within brake assembly 550. Processing circuitry 540 determines timestamps indicative of the transmitted and reflected signals. Processing circuitry 540 is configured to use the timestamps to determine a remaining wear length of the wear indicator pin. The determined estimate of remaining use, the determined wear pin length measurement, and the time information may then be transferred to various other systems and interfaces for further use.

For example, the wear pin length and a corresponding predicted remaining brake lifespan, or an estimated remaining number of braking events, may be transmitted for display in avionics bay of an aircraft on which the brake assembly on which the measurement was made. A log of wear pin measurements may be stored to analyze braking and wear trends over time. This data may be kept in storage 562 or transferred offsite to cloud storage 564 for wider access by the airline. The wear pin measurement data can be used by airlines or the operators of other vehicles for further analytics 566, monitoring the rate and trend at which brake wear is happening per landing. Based on the trend data airline can predict how many more takeoffs or landings can be performed before brake maintenance or brake replacements are required.

Another example application of enhanced data analytics 566 is to design a customized training plan for pilots for cases where considerable amount of brake pin wear is observed frequently during landings and are attributed to judgment error of vehicle operators, for example, landing the aircraft long and applying hard brakes to stop the aircraft under normal weather conditions. Data analytics 566 may associate each braking event with data such as vehicle operator, weather conditions, runway length, runway surface type (asphalt, concrete, etc.), runway conditions, and/or other relevant data. Data analytics 566 may determine which vehicle operators are "hard brakers" based on the rate of wear associated with each vehicle operator and each braking event.

Another example application of enhanced data analytics 566 is to design and implement an improved pricing mechanism. The wear pin measurement trend data, combined with operating conditions data, for example, runway data, contamination data, weather, and climate conditions, may be used by brake suppliers to design a better pricing mechanism. For example, if the brake system is used in harsh or severe weather or runway conditions, the tendency of hard braking would be higher, and the brakes would wear down faster. Knowing such details, a brake supplier could implement a pricing system based on an estimated cost per braking event. The pricing system can be tailored to the individual needs and environments of each customer. For example, an original equipment manufacturer (OEM) may determine pricing and the terms of annual maintenance contracts based on data determined by processing circuitry 540.

Another application of the wear pin measurement data is for use by a maintenance technician or group 580. Determined brake data may be sent to handheld device 570, for example a device dedicated solely to brake assembly data, or alternatively, a multi-purpose device such as a smartphone. Maintenance operations 580 may use the information to monitor when the brake assembly is due for maintenance or replacement, and prepare the replacement parts, thereby reducing the turnaround time and aircraft downtime.

In some examples, a computing device (e.g., processing circuitry 540, the computing system(s) of avionics bay 560, or handheld device 570) and/or an application (e.g., cloud application 564 or data analytics 566) may be configured to determine multiple lengths of the wear pin over time. For example, processing circuitry 540 may be configured to cause transceiver 510 to transmit and receive signals at a first time and a second time, where processing circuitry 540 determines a first length of the wear pin based on the first time and the second time. Processing circuitry 540 may be further configured to cause transceiver 510 to transmit and receive signals at a third time and a fourth time, where processing circuitry 540 determines a second length of the wear pin based on the third time and the fourth time. Processing circuitry 540 may perform additional measurements of the length of the wear pin.

Based on the multiple measurements of the length, the computing device and/or the application may determine a number of braking events between measurements based on records of the vehicle operation. The computing device and/or the application may determine a rate of wear based on the lengths and the number of braking events. The rate of wear may indicate whether the vehicle operator is a hard braker. The presence or absence of other factors such as weather, surface type, and/or surface conditions can also affect the rate of wear. The computing device and/or the application may store the lengths and the rate of wear to storage 562. If the computing device and/or the application determines that the rate of wear exceeds a threshold rate, the computing device and/or the application can generate an alert.

The computing device and/or the application may determine an estimated remaining use on brake assembly 550 based on the length(s) and/or the rate of wear. Other factors that affect the estimated remaining use include the expected type of operation in the future, the expected weather conditions in the future (e.g., based on location and time of year), and expected surface types in the future. The computing device and/or the application may determine the remaining use in terms of time (e.g., a number of days or weeks) or in terms of the number of remaining braking events (e.g., ten remaining landings before replacement).

Figure 6:
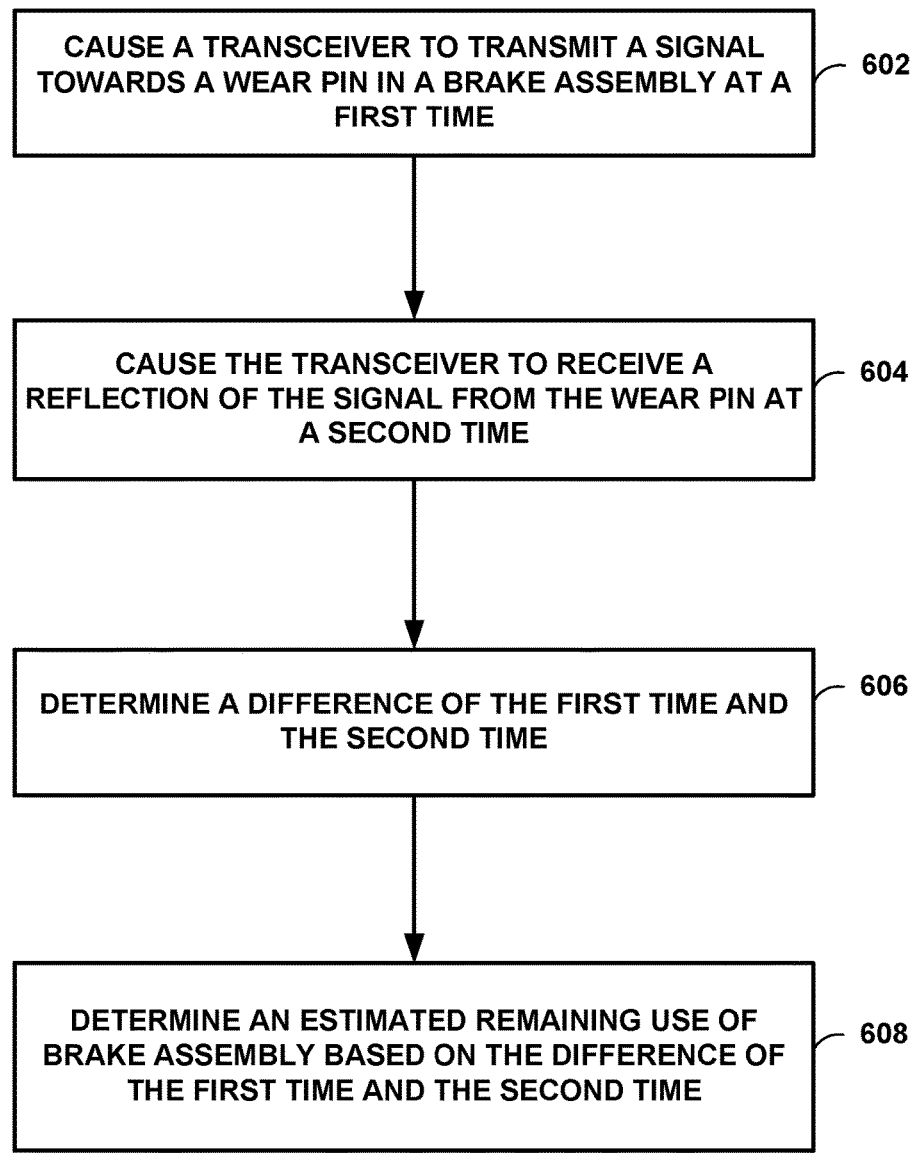
FIG. 6 shows a flowchart for example techniques for determining an estimated remaining use of a brake assembly, in accordance with some examples of this disclosure.

FIG. 6 shows a flowchart for an example technique for determining an estimated remaining use of a brake assembly, in accordance with some examples of this disclosure. The technique of FIG. 6 is described with reference to device 100 of FIG. 1, although devices 200, 330, and 430 may also perform similar techniques. In the example of FIG. 6, processing circuitry 120 causes transceiver 110 to transmit signal 140 at a first time, for example a laser or other electromagnetic signal, toward an exposed end of wear indicator pin 160 (602). In the example of FIG. 6, transceiver 110 receives, for example by a receiving component of transceiver 110 such as an antenna, reflection 150 of transmitted signal 140 at a second, later time (604). Transceiver 110 may have a "transmit" antenna that is separate from the "receive" antenna, or transceiver 110 may include one or more antennas configured to both transmit signal 140 and receive signal 150.

In the example of FIG. 6, processing circuitry 120 determines a time difference between the first time of transmission and the second time of receipt (606). Based on the time difference, processing circuitry 120 may then determine a distance travelled by signals 140 and 150 based on the speed of signals 140 and 150 and the difference between the first time and the second time. Processing circuitry 120 may use the first recorded time, the second recorded time, and the known speed of the signal to determine the distance travelled by the signal between the first time and the second time. These values may be related by the basic equation that the velocity of the signal is equivalent to the distance travelled by the signal divided by the time during which the signal travels that distance, as shown in Equation (1) above. The distance travelled by the signal is the velocity of the signal multiplied by the time during which the signal travels.

In the example of FIG. 6, processing circuitry 120 determines an estimated remaining use of brake assembly 170 based on the time difference between the first time and the second time (608). Processing circuitry 120 can determine the estimated remaining use of brake assembly 170 directly from the time difference, or processing circuitry 120 may first determine the length of wear indicator pin 160 based on the difference of the first time and the second time. The length of wear indicator pin 160 may be an exposed length of wear indicator pin 160. Processing circuitry 120 may determine the length of wear indicator pin 160 as the difference between the known length between the distal end of the wear indicator pin 160 and the source of transmitted signal 140, and the previously determined distance travelled by reflected signal 150. The "distal" end of wear indicator pin 160 refers to the end in contact with the brakes (e.g., plate 180 shown in FIG. 1 and/or pressure plate 320 shown in FIG. 3), where the "proximal" end is closer to transceiver 110.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry 120 and 220 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Devices 100 and 200 may include one or more memory devices, such as memory devices 130 and 230, that include any volatile or non-volatile media, such as a RAM, ROM, non-volatile RAM (NVRAM), electrically erasable programmable ROM (EEPROM), flash memory, and the like. Memory devices 130 and 230 may store computer-readable instructions that, when executed by processing circuitry, cause the processing circuitry to implement the techniques attributed herein to processing circuitry 120 and 220.

Elements of processing circuitry 120 and 220 and/or memory device 130 and 230 may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of processing circuitry 120 and 220 and/or memory device 130 and 230 as in any of the examples herein may be implemented as a device, a system, an apparatus, and may embody or implement a method of determining an estimated altitude of a melting layer.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Various examples of the disclosure have been described. Any combination of the described systems, operations, or functions is contemplated. These and other examples are within the scope of the following claims.

What is claimed is:

1. A device configured to determine an estimated remaining use of a brake assembly, the device comprising:

an attachment element configured to attach the device to a brake carrier of the brake assembly without the device contacting a wear pin in the brake assembly;

a transceiver configured to:
 transmit a signal towards the wear pin at a first time, wherein the wear pin moves relative to the brake carrier as a brake lining of the brake assembly wears down over time; and
 receive a reflection of the signal from the wear pin at a second time; and processing circuitry configured to:
 determine a difference of the first time and the second time; and
 determine the estimated remaining use of the brake assembly based on the difference of the first time and the second time.

2. The device of claim 1,
 wherein the processing circuitry is further configured to determine a distance to length of the wear pin based on the difference of the first time and the second time, and
 wherein the processing circuitry is configured to determine the estimated remaining use of the brake assembly based on the length of the wear pin.

3. The device of claim 1, wherein the processing circuitry is further configured to:
 determine whether the estimated remaining use of the brake assembly is less than a threshold amount; and
 generate an alert in response to determining that the estimated remaining use of the brake assembly is less than the threshold amount.

4. The device of claim 3, further comprising a communication module configured to transmit the alert to an external device, wherein the communication module comprises a Wi-Fi device, a Bluetooth device, a radio-frequency identification device, or a near-field communication device.

5. The device of claim 1, further comprising a communication module configured to transmit an indication of the estimated remaining use of the brake assembly to an external device, wherein the communication module comprises a Wi-Fi device, a Bluetooth device, a radio-frequency identification device, or a near-field communication device.

6. The device of claim 1, wherein the signal is a first signal, wherein the reflection is a first reflection, and wherein the estimated remaining use of the brake assembly is a first estimated remaining use of the brake assembly, and wherein the transceiver is further configured to:
 transmit a second signal towards the wear pin at a third time; and
 receive a second reflection of the second signal from the wear pin at a fourth time, wherein the processing circuitry is further configured to:
 determine a difference of the third time and the fourth time; and
 determine a second estimated remaining use of the brake assembly based on the difference of the third time and the fourth time.

7. The device of claim 6, wherein the processing circuitry is further configured to:
 determine a number of braking events between the first time and the third time; and
 determine a rate of wear based on the first estimated remaining use of the brake assembly, the second estimated remaining use of the brake assembly, and the number of braking events.

8. The device of claim 7, wherein the processing circuitry is further configured to:

determine that the rate of wear exceeds a threshold rate; and
 generate an alert in response to determining that the rate of wear exceeds the threshold rate.

9. The device of claim 7, further comprising a memory device, wherein the processing circuitry is further configured to:
 store the first estimated remaining use of the brake assembly to the memory device; and
 store the second estimated remaining use of the brake assembly to the memory device.

10. The device of claim 1, further comprising a memory device configured to store a mapping of times to estimates of remaining use of the brake assembly, wherein the processing circuitry is further configured to update the mapping based on the difference of the first time and the second time.

11. The device of claim 1, wherein the processing circuitry is configured to determine the estimated remaining use of the brake assembly by at least determining a distance between the transceiver and the wear pin based on a difference of the first time and the second time.

12. The device of claim 1, wherein the transceiver comprises a laser.

13. A method comprising:
 causing a transceiver attached to a brake carrier of a brake assembly without the transceiver contacting a wear pin in the brake assembly to transmit a signal towards the wear pin in the brake assembly at a first time, wherein the wear pin moves relative to the brake carrier as a brake lining of the brake assembly wears down over time;
 causing the transceiver to receive a reflection of the signal from the wear pin at a second time;
 determining a difference of the first time and the second time; and
 determining an estimated remaining use of a brake assembly based on the difference of the first time and the second time.

14. The method of claim 13, further comprising:
 determining, in a first instance, that the estimated remaining use of the brake assembly is less than a threshold amount;
 generating an alert in response to determining that the estimated remaining use of the brake assembly is less than the threshold amount;
 causing a communication module to transmit the alert to an external device, wherein the communication module comprises a Wi-Fi device, a Bluetooth device, a radio-frequency identification device, or a near-field communication device;
 determining, in a second instance, that the estimated remaining use of the brake assembly is greater than the threshold amount; and
 refrain from generating the alert in response to determining that the estimated remaining use of the brake assembly is greater than the threshold amount.

15. The method of claim 13, further comprising causing a communication module to transmit an indication of the estimated remaining use of the brake assembly to an external device, wherein the communication module comprises a Wi-Fi device, a Bluetooth device, a radio-frequency identification device, or a near-field communication device.

16. The method of claim 13, wherein the signal is a first signal, wherein the reflection is a first reflection, and wherein the estimated remaining use of the brake assembly is a first estimated remaining use of the brake assembly, the method further comprising:

causing the transceiver to transmit a second signal towards the wear pin at a third time;

causing the transceiver to receive a second reflection of the second signal from the wear pin at a fourth time;

determining a difference of the third time and the fourth time;

determining a second estimated remaining use of the brake assembly based on a difference of the third time and the fourth time;

determining a number of braking events between the first time and the third time; and determining a rate of wear based on the first estimated remaining use of the brake assembly, the second estimated remaining use of the brake assembly, and the number of braking events.

17. The method of claim 13, further comprising:

determining a distance between the transceiver and the wear pin based on a difference of the first time and the second time; and determining a length of the wear pin based on the distance between the transceiver and the wear pin, wherein determining the remaining use on the brake assembly is based on the length of the wear pin.

18. A device configured to determine a rate of wear for a brake assembly, the device comprising:

a transceiver configured to:

transmit a first signal towards a wear pin in the brake assembly at a first time;

receive a first reflection of the first signal from the wear pin at a second time;

transmit a second signal towards the wear pin at a third time; and receive a second reflection of the second signal from the wear pin at a fourth time; and processing circuitry configured to:

determine a first estimated remaining use of the brake assembly based on a difference of the first time and the second time;

determine a second estimated remaining use of the brake assembly based on a difference of the third time and the fourth time;

determine a number of braking events between the first time and the third time; and determine the rate of wear based on the first estimated remaining use of the brake assembly, the second estimated remaining use of the brake assembly, and the number of braking events.

19. The device of claim 18, wherein the processing circuitry is further configured to determine a distance to the wear pin based on the difference of the first time and the second time, and wherein the processing circuitry is configured to determine the estimated remaining use of the brake assembly based on the length of the wear pin.

20. The device of claim 18, wherein the processing circuitry is configured to determine the estimated remaining use of the brake assembly by at least determining a distance between the transceiver and the wear pin based on a difference of the first time and the second time.

* * * * *